Patented July 31, 1951

2,562,848

UNITED STATES PATENT OFFICE 2,562,848

PREPARATION OF 6-AMINO 2-HYDROXY CARBOXYLIC ACID COMPOUNDS

Richard R. Whetstone, Albany, Calif., assignor to Shell Development Company, San Francisco, Calif., a corporation of Delaware No Drawing. Application January 24, 1949, Serial No. 72,556

5 Claims. (Cl. 260—534)

This invention relates to a new and improved method for the synthesis of alpha-substituted epsilon-amino carboxylic acid compounds. In one of its embodiments it relates particularly to a new method for the synthesis of dl-lysine. d-Lysine is important as one of the dietetically essential naturally occurring amino acids.

Alpha-substituted epsilon-amino carboxylic acid compounds have been synthesized in various ways heretofore. In the case of lysine known methods for its synthesis have been reviewed by M. S. Dunn in "The Chemistry of the Amino Acids and Proteins," edited by C. L. A. Schmidt, pages 78 to 81, Charles C. Thomas, 1938. Known methods for the synthesis of alpha-substituted epsilon-amino carboxylic acid compounds have not been entirely satisfactory. In some cases, difficultly procurable or expensive raw materials are required, and most, if not all, of the known methods require the use of a plurality of organic raw materials. Low yields and complex procedures also detract from the usefulness on any but a laboratory scale of heretofore known processes. Because of the importance, industrially and for biological or medical purposes, of alpha-substituted epsilon-amino carboxylic acid compounds, such as lysine, there has been a recognized need for an improved method for the synthesis of these valuable products.

In accordance with the present invention, there now has been discovered and conceived a new and improved method for the synthesis of alpha-substituted epsilon-amino carboxylic acid compounds. The new method, which in conjunction with the accomplishment of individual steps thereof forms a principal object of the invention, preferably starts with acrolein as a raw material commercially available at low cost. The new method is distinguished from previously known methods for the synthesis of alpha-substituted epsilon-amino carboxylic acid compounds, such as lysine, by the unique fact that the acrolein is the only organic material which need be supplied in the entire synthesis. No other organic material thus is required, although at one step in the synthesis of lysine it may be desired for the purpose of "protecting" an amino group during a subsequent operation to combine the amino group with benzoyl chloride or other suitable reagent, the residue of which is ultimately removed and does not appear in the final product. The new synthesis is characterized not only by the good yields obtainable, but by the simplicity of the manipulative procedures required in the individual steps of the processes. A further advantage of the method is the fact that the only materials required are commercially obtainable and are available at low cost. Other advantages of the invention will become apparent hereinafter.

The principles of the new method may be illustrated by means of the following equations which describe reactions involved in the synthesis of alpha-substituted epsilon-amino carboxylic acid compounds from acrolein:

(1) Acrolein is converted to 3,4-dihydro-1,2-pyran-2-carboxaldehyde by heating in the presence of a polymerization inhibitor.

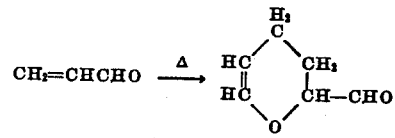

The reaction may be carried out by heating acrolein in an inert solvent medium, such as benzene or other aromatic or an aliphatic hydrocarbon solvent, in the presence of a polymerization inhibitor, such as hydroquinone or other phenolic polymerization inhibitor, at about 170° C. to about 225° C. under pressure to maintain the mixture liquid.

(2) The 3,4-dihydro-1,2-pyran-2-carboxaldehyde is converted to 3,4-dihydro-1,2-pyran-2-carboxylic acid (a)

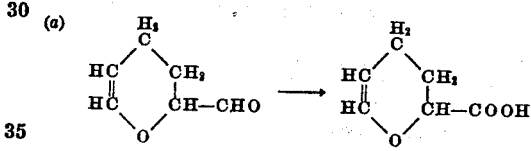

The conversion may be accomplished by oxidizing the aldehyde as by treatment with silver oxide in an anhydrous, preferably mildly alkaline medium, or by other suitable oxidizing agent, or the aldehyde preferably may be treated with an aluminum alcoholate such as aluminum isopropoxide to effect the reaction described by the equation (b)

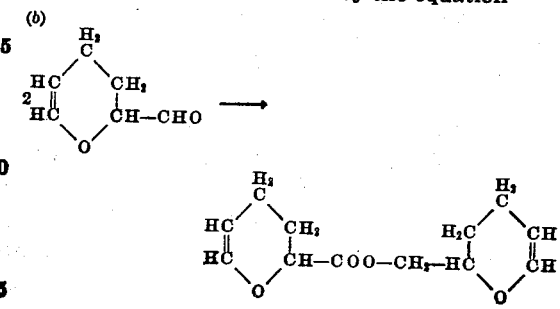

The ester thus produced may be saponified to produce the desired acid in the form of its salt of the saponifying alkali.

(3) The 3,4-dihydro-1,2-pyran-2-carboxylic acid is converted to 7-oxo-6,8-dioxabicyclo-[3.2.1]-octane

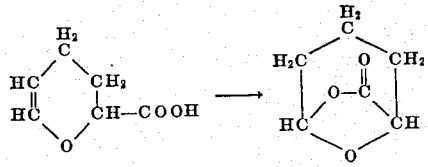

This latter compound and a process for its preparation form in part the subject matter of the invention claimed by me in my copending application Serial No. 749,077, filed May 19, 1947, now U. S. Patent No. 2,511,890.

(4) The 7-oxo-6,8-dioxabicyclo[3.2.1]octane is converted by treatment with ammonia and with hydrogen in the presence of a hydrogenation catalyst to epsilon-amino-alpha-hydroxycaproic acid. Epsilon-amino-alpha-hydroxycaproamide may be also produced by the treatment and in some cases it even may be the predominating product. The amide may be hydrolyzed by known methods for the hydrolysis of amides to carboxylic acids or in other instances may be employed with or in lieu of the free acid in the succeeding steps of the synthesis and the hydrolysis to liberate the free carboxyl group carried out subsequently

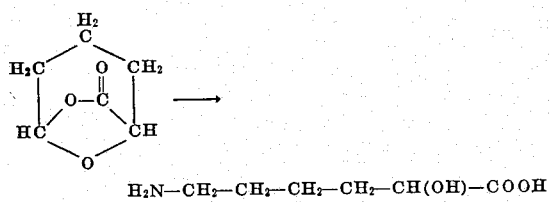

The process for accomplishing the conversion of 7-oxo-6,8-dioxabicyclo[3.2.1]octane to epsilon-amino-alpha-hydroxycaproic acid and/or its amide forms an important and novel feature of the present invention and is claimed per se in this application.

(5) When it is desired to prepare lysine from the epsilon-amino-alpha-hydroxycaproic acid thus obtained according to the invention, the hydroxyl group in alpha position is replaced by an atom of bromine or other suitable halogen, e. g. chlorine or iodine. Prior to carrying out this step it is preferable to convert the amino group in epsilon position to a combined or "protected" form, for example, by benzoylation or other known equivalent treatment. The replacement of hydroxyl by bromine then proceeds as follows (in the case of the N-benzoyl derivative):

C₆H₅—CO—NH—CH₂—CH₂—CH₂—
    CH₂—CH(OH)—COOH→C₆H₅—CO—NH—
        CH₂—CH₂—CH₂—CH₂—CHBr—COOH (6) The epsilon-benzoylamino-alpha-bromocaproic acid, which is a known compound, then may be converted to dl-lysine by the following steps:

a.

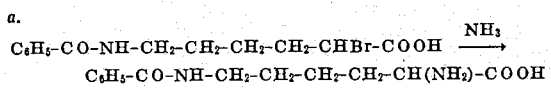

b.

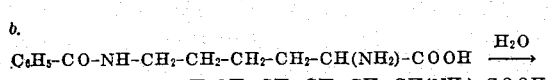

These reactions, which are known reactions, conveniently may be carried out according to the method of J. V. Braun, Berichte, Volume 42, pages 839–46 (1909).

Instead of employing the succeeding steps illustrated for the synthesis of lysine from the epsilon-amino-alpha-hydroxy carboxylic acid (or amide) other valuable alpha-substituted epsilon-amino carboxylic acid compounds may be prepared therefrom, for example, by replacing the hydroxyl group, either directly or indirectly by another substituent, such as cyano, nitro, alkoxy, sulfur, thiocyano, carboalkoxy, isocyano, etc.

The method of the invention may be illustrated in greater detail, without, however, the intention of imposing unnecessary limitations upon its scope as it is defined in the appended claims, by reference to the following examples wherein specific embodiments of steps of the processes are described and wherein, unless otherwise specified, the parts are by weight.

EXAMPLE I

PREPARATION OF 3,4-DIHYDRO-1,2-PYRAN-2-CARBOXYLIC ACID

A. By oxidation of 3,4-dihydro-1,2-pyran-2-carboxaldehyde (1) There were stirred together in a flask equipped with a water cooled reflux condenser 176 grams of 3,4-dihydro-1,2-pyran-2-carboxaldehyde (prepared by heating in a sealed tube a mixture of about 75 parts of acrolein, about 25 parts of benzene and about 0.1 part of hydroquinone for about 5 hours at about 180° C., and distilling the products to separate the 3,4-dihydro-1,2-pyran-2-carboxaldehyde), 462 grams of silver oxide and 500 cubic centimeters of benzene. While the mixture was stirred, the temperature rose to 40° C. over a period of three hours. The reaction then accelerated. The benzene refluxed and cooling was necessary to prevent excess ebullition. The reaction subsided after about 15 minutes. The mixture then was filtered and the insoluble silver salt of 3,4-dihydro-1,2-pyran-2-carboxylic acid mixed with silver and silver oxide was thereby separated.

(2) In another experiment, the silver salt of 3,4-dihydro-1,2-pyran-2-carboxylic acid was prepared by slowly adding 3,4-dihydro-1,2-pyran-2-carboxaldehyde to a boiling suspension of silver oxide in benzene, and after the reaction had gone to completion collecting the solid product by filtration. The yield in both cases was about 85% to 90% of theory.

Instead of silver oxide other suitable oxidizing agents may be employed.

B. Via 2-(3,4-dihydro-1,2-pyranyl)methyl 3,4-dihydro-1,2-pyran-2-carboxylate To 500 grams of 3,4-dihydro-1,2-pyran-2-carboxaldehyde in an open flask there were added 2.5 grams of aluminum isopropoxide and the temperature of the mixture was maintained by cooling as necessary at about 30° C. for 4 hours. The mixture then was fractionally distilled under reduced pressure. The 2-(3,4-dihydro-1,2-pyranyl)methyl 3,4-dihydro-1,2-pyran-2-carboxylate was recovered in a yield of about 75% of theory as the fraction distilling between 115° C. and 125° C. under a pressure of 0.5 mm. of mercury. The ester was saponified by heating with a slight stoichiometric excess of 20% by weight aqueous sodium hydroxide solution. The alcohol formed by the saponification was removed by extraction of the alkaline solution with ether leaving an aqueous solution of the sodium salt of 3,4-dihydro-1,2-pyran-2-carboxylic acid.

In place of the aluminum isopropoxide in the preceding experiment, other aluminum alcoholates may be used, such as aluminum ethoxide, aluminum propoxide and the aluminum butoxides. Inert solvents, such as hydrocarbon solvents, halogenated hydrocarbon solvents, ethers and like solvents devoid of hydroxyl groups may be present, although, as shown, the reaction proceeds satisfactorily in the absence of solvents or diluents. The amount of the aluminum alkoxide is not critical, from about 0.5 to about 5% by weight of the 3,4-dihydro-1,2-pyran-2-carboxaldehyde being generally effective. It is not essential to separate the ester from the reaction mixture prior to the saponification, although it generally is preferable to do so. Likewise, it is not essential to separate from the saponification mixture the alcohol formed by the saponification, although it is preferred to do so since side reactions which might be favored by its presence during subsequent operations thus are avoided.

EXAMPLE II

PREPARATION OF 7-OXO-6,8-DIOXABICYCLO[3.2.1]OCTANE

The 3,4-dihydro-1,2-pyran-2-carboxylic acid, if obtained in the form of a salt as in the experiments of Example I, is prepared by addition of an acid, such as a strong mineral acid, to the salt or to an aqueous solution of the salt and by extraction of the acidified product with ether or other suitable solvent in which the desired carboxylic acid is soluble. The 3,4-dihydro-1,2-pyran-2-carboxylic acid then is converted by the action of heat, if desired, in the presence of a small amount of a strong mineral acid, or by the action of an acid alone, to 7-oxo-6,8-dioxabicyclo[3.2.1]octane. Thus, a solution of about 70 parts of sodium 3,4-dihydro-1,2-pyran-2-carboxylate in about 250 parts of water, the solution having been prepared as in Example I, was acidified by addition of 6 N hydrochloric acid. The acidified solution was extracted with a total of about 1050 parts of diethyl ether in several portions. The ether was evaporated from the combined extracts and the residue subjected to distillation under reduced pressure. There were recovered about 47 parts of 7-oxo-6,8-dioxabicyclo[3.2.1]octane distilling at 62° C. to 64° C. under a pressure of 3 mm. of mercury.

EXAMPLE III

PREPARATION OF EPSILON-AMINO-ALPHA-HYDROXY-CAPROIC ACID (AMIDE)

(1) A 12 gram portion of 7-oxo-6,8-dioxabicyclo[3.2.1]octane prepared by the method illustrated in Example II was dissolved in about 50 grams of concentrated (d.=0.9) aqueous ammonia solution. The mixture warmed spontaneously to about 50° C. The solution was transferred to a hydrogenation vessel containing Raney nickel hydrogenation catalyst, the vessel was sealed from the atmosphere, and about 60 grams of ammonia (NH$_3$) were introduced into it. The mixture then was hydrogenated in the presence of the excess ammonia by treatment with hydrogen gas under a pressure of about 1600 pounds per square inch, commencing at about 100° C. and concluding at about 160° C. Uptake of hydrogen was rapid. When no more was absorbed the hydrogenation was considered to be complete. After removal of the catalyst by filtration, the resulting solution, containing the epsilon-amino-alpha-hydroxy-caproic acid in the form of its amide, was evaporated substantially to dryness. The residue was dissolved in a small amount of water, an excess of 20% sodium hydroxide solution was added, and the epsilon amino group was benzoylated by careful addition of a slight excess of benzoyl chloride to the alkaline solution. The epsilon-benzoyl-amino-alpha-hydroxycaproamide was crystallized from ethanol in a yield of about 60% of theory based on 7-oxo-6,8-dioxabicyclo[3.2.1]octane. The epsilon-benzoylamino-alpha-hydroxycaproamide was convertible by treatment with hot hydrochloric acid to epsilon-amino-alpha-hydroxycaproic acid.

Once recrystallized epsilon-benzoylamino-alpha-hydroxycaproamide was found to melt at about 162° C., while the epsilon-amino-alpha-hydroxycaproic acid thus prepared melted at about 210° C. Analyses for the amide: found, 62.4% C, 7.2% H, 10.8% N; calculated for $C_{13}H_{18}O_3N_2$, 62.5% C, 7.27% H, 11.2% N. Analyses for the acid: found, 48.4% C, 8.9% H, 9.7% N; calculated for $C_6H_{13}O_3N$, 48.3% C, 8.9% H, 9.5% N.

(2) When a further 12 gram portion of 7-oxo-6,8-dioxabicyclo[3.2.1]octane was dissolved in 75 cubic centimeters of concentrated (d.=.90) aqueous ammonia, the solution warmed spontaneously to about 50° C. Upon hydrogenation of the resulting solution in contact with Raney nickel catalyst at a maximum temperature of 121° C. by treatment with hydrogen gas under 1400 pounds per square inch pressure, 0.78 mole of hydrogen per mole of the 7-oxo-6,8-dioxabicyclo[3.2.1]octane was rapidly absorbed. The filtered solution was evaporated until 12 grams remained. Crystals slowly formed in the residue upon standing. The partially crystallized mixture was stirred with ethanol, the resulting crystals after separation by filtration from the mother liquor were dissolved in warm ethanol by addition of a small amount of water, and the solution was slowly cooled. The purified product thus obtained, was shown by analyses to be epsilon-amino-alpha-hydroxycaproic acid. There was obtained by evaporation of the combined mother liquors remaining from the crystallizations, and treatment of the residue dissolved in concentrated aqueous sodium hydroxide solution with benzoyl chloride, a product which after two recrystallizations from ethanol corresponded in melting point and analyses to epsilon-benzoylamino-alpha-hydroxycaproamide.

(3) As a further illustration of this step of the process, 45 grams of 7-oxo-6,8-dioxabicyclo[3.2.1]octane were slowly added to 111 grams of concentrated aqueous ammonia with cooling by immersion of the vessel in an ice-bath. To the resulting solution in a hydrogenation vessel there were added 80 grams of ammonia (NH$_3$), and the mixture was hydrogenated over Raney nickel initially at 50° C. to 80° C. and finally at 125° C. to 150° C. by treatment with hydrogen gas under about 1500 pounds per square inch pressure. The residue remaining after removal of the catalyst by filtration and evaporation of the filtrate at steambath temperatures, was a dark crystalline paste. It was dissolved in 50 grams of water, 200 grams of 20% aqueous sodium hydroxide solution were added, and an excess of benzoyl chloride was slowly added with stirring. The product thus prepared was combined with the product from a second identical experiment, and the combined products recrystallized from ethanol giving 75 grams of purified epsilon-benzoylamino-alpha-hydroxycaproamide.

EXAMPLE IV

PREPARATION OF EPSILON-BENZOYLAMINO-ALPHA-BROMOCAPROAMIDE (1) To 17 grams of a solution of hydrogen bromide in acetic acid, prepared by dissolving 20 grams of anhydrous HBr in 31 grams glacial acetic acid, there were added 1.13 grams of epsilon-benzoyl-alpha-hydroxycaproamide, and the mixture was heated in a sealed tube at 110° C. for 5 hours. The resulting liquid product, after standing overnight, was filtered at 0° C. from the crystals which formed, and evaporated in vacuo. By dissolution of the residue in a small amount of ethanol and addition of an excess of water, an insoluble oil was obtained which, upon standing, formed crystals of epsilon-benzoylamino-alpha-bromocaproamide. Melting point, after recrystallization from ethanol, 160° C.

(2) In another experiment, 4.03 grams of epsilon - benzoylamino - alpha - hydroxycaproamide were heated in a sealed tube at 110° C. for 5 hours with a further 27 grams of the glacial acetic acid solution of hydrogen bromide used in the preceding experiment. The mixture was removed from the tube and HBr and acetic acid evaporated off. Epsilon-benzoylamino-alpha - bromocaproic acid was recovered in a yield of 73% of theory by addition of a small amount of warm water to the residue and crystallizing the product from the mixture by cooling and seeding with a previously prepared crystal of the product.

EXAMPLE V

PREPARATION OF DL-LYSINE (EPSILON-BENZOYL DERIVATIVE)

The epsilon-benzoylamino-alpha-bromocaproic acid prepared in Example IV was dissolved in 10 times its weight of concentrated (d.=.90) aqueous ammonia solution. After 48 hours standing at room temperature, the solution was evaporated in vacuo, and the crystals of Nε-benzoyllysine were washed with small amounts of water, ethanol, and ether. N,N' - dibenzoyl - dl - lysine prepared by benzoylation of the product thus obtained melted after recrystallization at 141–143° C. When mixed with an independently synthesized authentic sample of N,N'-dibenzoyl-dl-lysine (melting point 144–145° C.), the melting point of the mixture was 142–144° C. The Nε-benzoyl-dl-lysine and the N,N'-dibenzoyl-dl-lysine thus prepared both can be converted by known procedures to dl-lysine which, if desired, can be resolved by known procedures into its optically active enantiomorphs.

The novel reaction illustrated by the experiments described in detail in Example III, which effects the direct conversion of the 7-oxo-6,8-dioxabicyclo[3.2.1]octane compound to epsilon-amino alpha-hydroxy carboxylic acid compounds, such as epsilon-amino - alpha - hydroxy - caproic acid and/or its amide, has enabled the simultaneous synthesis of the open chain structure of the carboxylic acid compound and introduction of the alpha-hydroxyl and the epsilon-amino groups. The step provides significant advantages over prior methods of synthesis wherein it is necessary to prepare initially the unsubstituted carboxylic acid compound or the epsilon-amino carboxylic acid compound and then by further treatments to introduce the second substituent, e. g., hydroxyl, into the product thus obtained. The necessity for such additional treatments or conversions of intermediate products not only thus is avoided by the present method, but improved high yields of the desired product are obtained.

Although aqueous ammonia, as illustrated in Example III, is preferred, solutions of ammonia in other polar, or oxygenated solvents may be employed, such as, for example, methanol, ethanol, propanol, isopropanol, ethylene glycol, propylene glycol, trimethylene glycol, glycerol, dioxane, etc. Less desirably (because better yields of the desired carboxylic acid compounds generally may be obtained when the reaction is carried out in a polar solvent medium), the solvent may be a non-polar medium or may be dispensed with entirely. From the standpoint of manipulative convenience and also because of the good yields obtained, water is the preferred solvent, and it conveniently may be supplied as the water contained in concentrated aqueous solutions of ammonia.

The ammonia desirably is employed in molar excess relative to the 7-oxo-6,8-dioxabicyclo[3.2.1]octane compound, mole ratios of at least 10:1 being preferred. From the standpoint of operability there is no known upper limit to the amount of ammonia that may be employed, although for convenience of operation less than, say, about 100 moles of ammonia per mole of the 7 - oxo - 6,8 - dioxabicyclo[3.2.1]octane compound ordinarily will be used. A preferred method of operation is to introduce a portion of the ammonia, preferably from about 2 to about 10 moles per mole of the 7-oxo-6,8-dioxabicyclo[3.2.1]octane compound, in the form of a concentrated aqueous solution of ammonia, and the balance as anhydrous ammonia ($NH_3$). However, greater or lesser proportions of the ammonia may be supplied as aqueous ammonia, or even all of the ammonia may be supplied as anhydrous ammonia and the solvent (if one is employed) e. g., water or other solvent, added separately.

If it is desired to prepare an Nε-substituted alpha-substituted epsilon-amino carboxylic acid compound, there may be substituted for the ammonia in equivalent amounts a suitable compound containing the amino group =NH, such as any suitable primary amine, as an alkyl, aryl, alkaryl, aralkyl or cycloaliphatic primary amine, or a secondary amine, such as any suitable dialkyl, alkylaryl, diaryl, or cycloaliphatic secondary amine. Representative amines are, for example, methylamine, cyclopentylamine, aniline, octylamine, N-methylaniline, dihexylamine, dicyclohexylamine, decylamine, naphthylamine, 1,3-dimethylbutylamine, ethanolamine, N-cyclopentylaniline, N-methyldecylamine, and others. Such amines and ammonia may and will be referred to collectively as amino compounds containing the amino group =NH.

Any suitable hydrogenation catalyst may be employed. The invention is not limited to Raney nickel hydrogenation catalysts. Other hydrogenation catalysts which may be used include other nickel hydrogenation catalysts, as well as other base metal hydrogenation catalysts, such as catalysts comprising one or more of copper, chromium, iron, cobalt, vanadium, molybdenum, tungsten, and/or compounds and/or alloys thereof. Even noble metal hydrogenation catalysts, such as palladium, platinum, ruthenium, rhodium, iridium, etc., may be used. The amount of the hydrogenation catalyst may be varied as desirable from about 0.5% to about 30% by weight of the 7-oxo-6,8-dioxabicyclo[3.2.1]octane compound, the optimum amount depending upon the identity of the catalyst, the reaction conditions and like factors. For example, from about 2% to 20% by weight of Raney nickel catalyst, based on the weight of the liquid mixture may be used advantageously, although more or less may be employed if desirable.

Hydrogen pressures of, for example, from about 100 to about 20,000 pounds per square inch may be employed, a preferred range being from about 500 pounds per square inch to about 5000 pounds per square inch. The temperature used is dependent in part upon the activity of the hydrogenation catalyst, since as shown in the examples, reaction occurs even at ice bath temperatures. A broad range within which the reaction may be conducted is from about −15° C. to about 250° C. In the case of Raney nickel hydrogenation catalyst, for example, a preferred range of temperatures to be employed during the hydrogenation is from about 30° C. to about 175° C. Since the 7-oxo-6,8-dioxabicyclo[3.2.1]octane compound is essentially stable under hydrogenating conditions (in the absence of ammonia), it and the ammonia, the hydrogen, the solvent (if one is to be employed), and the hydrogenation catalyst may be brought into contact in any order. The desired reaction occurs simply upon making such contact under conditions favorable to hydrogenation, such as described above. After the reaction is completed, or substantially so, the epsilon-amino alpha-hydroxy carboxylic acid compounds may be recovered as by crystallization from the reaction mixture after removal of the catalyst, or they may be converted while in either the crude or a purified state to desired derivatives.

When it is desired to prepare lysine from the epsilon-amino alpha-hydroxycaproic acid compounds thus prepared, the epsilon-amino group preferably is converted to a combined amino group, as by acylation with benzoyl chloride or any other suitable acylating agent, such as an aliphatic acyl halide or other aryl acyl halide, by treatment with the benzyl ester of chlorocarbonic acid, or by other suitable procedures, the only limitation upon the method used being that the radical thus substituted on the nitrogen atom be stable during subsequent conversions of radicals within the molecule, but ultimately removable, as by hydrolysis, to regenerate subsequently the free amino group. The alpha-hydroxy group of the alpha-hydroxy epsilon-amino carboxylic acid compound may be replaced by halogen, preferably bromine but also including chlorine and iodine, by heating with a concentrated solution of the hydrohalide acid (HBr, HI, or HCl) in glacial acetic acid. The temperature in this step is critical. With a saturated solution of hydrogen bromide in glacial acetic acid, the reaction between HBr and alpha-hydroxy-epsilon-benzoyl-aminocaproic acid or its amide did not occur to a measurable extent at below 100° C., whereas, surprisingly, at about 110° C. or above, the reaction readily proceeded. Good yields of the desired alpha-bromo carboxylic acid may be obtained by heating, as in a closed vessel, the N-substituted epsilon-amino alpha-hydroxy carboxylic acid compound with an about 30% to 40% solution of hydrogen bromide in glacial acetic acid containing an excess of HBr over the amount theoretically required by the reaction to from about 105° C. to about 200° C., removing excess HBr and the acetic acid from the resulting mixture, and then separating the epsilon-amino alpha-halo carboxylic acid compound from the mixture. The epsilon-amino alpha-halo carboxylic acid compound may be converted to lysine or lysine derivative as hereinbefore explained, or the alpha-halogen atom may be replaced by other substituents to prepare a wide variety of useful alpha-substituted epsilon-amino carboxylic acid compounds.

While the invention has been described with particular reference to the preparation of dilysine from acrolein, as previously indicated herein other alpha-substituted epsilon-amino carboxylic acid compounds may be prepared, and from other 7-oxo-6,8-dioxabicyclo[3.2.1]octane compounds, described by me in said copending application, Serial No. 749,077, filed May 19, 1947, homologous and analogous alpha-substituted epsilon-amino carboxylic acid compounds may be prepared, such as alpha-alkyl epsilon-amino alpha-substituted carboxylic acid compounds and alpha-substituted alpha,delta-dialkyl epsilon-amino carboxylic acid compounds wherein the alkyl group or groups may contain as many as ten or even fourteen carbon atoms, e. g., alpha,gamma - dilauryl - epsilon - amino - alpha - hydroxycaproic acid or amide. Alpha,delta - dimethyl - epsilon - amino - alpha - hydroxycaproic acid may be prepared by reacting with hydrogen and with ammonia in the presence of a hydrogenation catalyst according to the method of the present invention 1,4-dimethyl-7 - oxo - 6,8 - dioxabicyclo[3.2.1]octane, prepared from methacrolein as described in said application Serial No. 749,077, now Patent No. 2,511,890. Alpha - methyl - epsilon - amino - alpha - hydroxycaproic acid compounds may be similarly prepared from 1 - methyl - 7 - oxo - 6,8 - dioxabicyclo[3.2.1]octane also disclosed in said copending application. Numerous valuable other epsilon-amino alpha-hydroxy carboxylic acid compounds may be prepared according to the invention from suitable 7 - oxo - 6,8 - dioxabicyclo[3.2.1]octane compounds obtained as disclosed in my said copending application.

When, in the claims, a process is defined as including a step of preparing from one chemical compound another chemical compound, it is not intended to limit the preparation to direct conversion, that is, it is not intended to exclude the possible formation of intermediate compounds or complexes, which compounds or complexes may or may not be stable and which may be further treated in the method employed for accomplishing the conversion.

It is intended only to limit the definition of the step to such processes that start with a quantity of the first-mentioned compound and prepare from it, directly or indirectly, a quantity of the compound stated in the claim to be prepared therefrom.

I claim as my invention:

1. A process which comprises reacting 7-oxo-6,8-dioxabicyclo[3.2.1]octane with ammonia and with hydrogen in the presence of a hydrogenation catalyst to produce an epsilon-amino-alpha-hydroxycaproic acid compound.

2. A process for the preparation of epsilon-amino-alpha-hydroxycaproamide, which comprises mixing an excess of ammonia with 7-oxo-6,8-dioxabicyclo[3.2.1]octane in the presence of water and hydrogenating the mixture by treatment with molecular hydrogen under superatmospheric pressure in the presence of a hydrogenation catalyst.

3. A process which comprises reacting a 7-oxo-6,8-dioxabicyclo[3.2.1]octane compound with ammonia and with hydrogen in the presence of a hydrogenation catalyst to produce an epsilon-amino alpha-hydroxy carboxylic acid compound.

4. A process which comprises reacting a 7-oxo-6,8-dioxabicyclo[3.2.1]octane compound with an amino compound containing the amino group =NH and with molecular hydrogen under superatmospheric pressure in the presence of a hydrogenation catalyst to produce an epsilon-amino alpha-hydroxy carboxylic acid compound.

5. A process which comprises reacting a 7-oxo-6,8-dioxabicyclo[3.2.1]octane compound with an amino compound containing the amino group =NH and with molecular hydrogen in the presence of a hydrogenation catalyst to produce an epsilon-amino alpha-hydroxy carboxylic acid compound.

RICHARD R. WHETSTONE.

REFERENCES CITED

The following references are of record in the file of this patent:

UNITED STATES PATENTS

| Number | Name | Date |
| --- | --- | --- |
| 2,350,370 | Schopmeyer et al. | June 6, 1944 |
| 2,389,099 | Wenner | Nov. 13, 1945 |
| 2,446,651 | Hartung | Aug. 10, 1948 |
| 2,461,847 | Shabica | Feb. 15, 1949 |
| 2,511,890 | Whetstone | June 20, 1950 |
| 2,514,156 | Geyer et al. | July 4, 1950 |